(No Model.)
N. YAGN.
RUBBER TIRE FOR VEHICLES.
No. 452,001. Patented May 12, 1891.
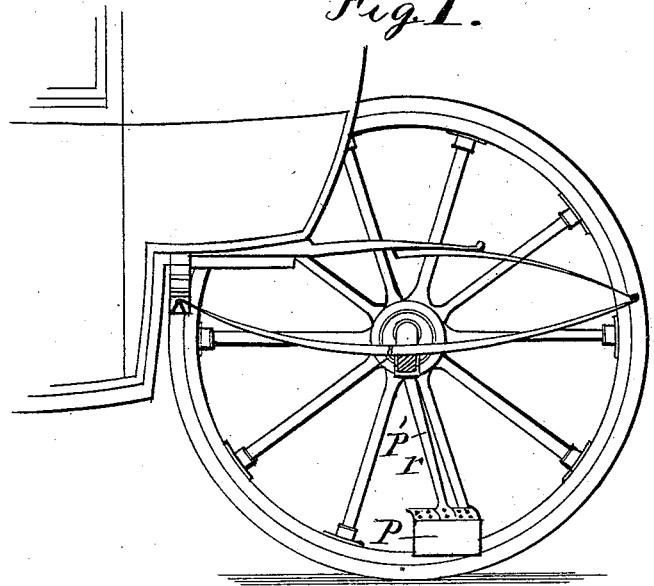
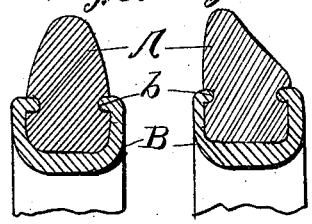
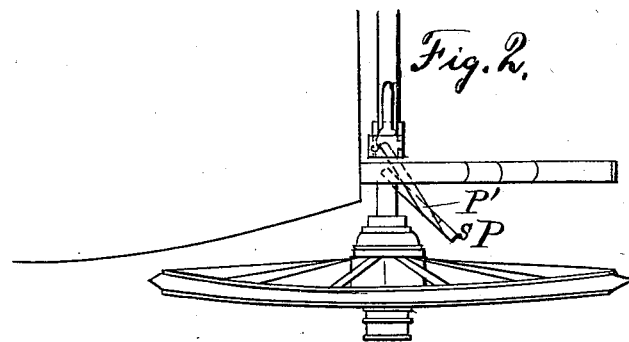
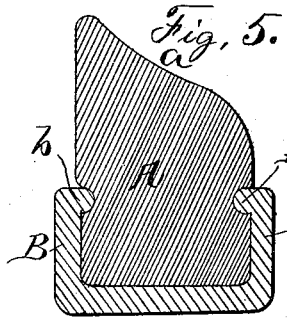
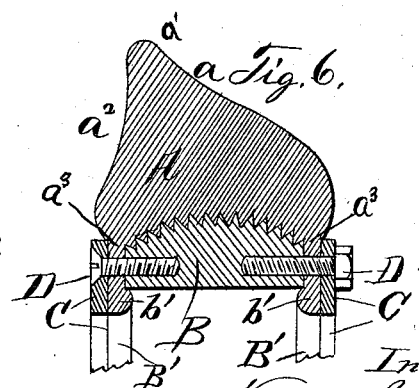
Witnesses:
Ella S. Johnson
B. H. Sommers
Inventor,
Nicholas Yagn

UNITED STATES PATENT OFFICE.

NICHOLAS YAGN, OF ST. PETERSBURG, RUSSIA.

RUBBER TIRE FOR VEHICLES.

SPECIFICATION forming part of Letters Patent No. 452,001, dated May 12, 1891.

Application filed December 22, 1890. Serial No. 375,498. (No model.)

*To all whom it may concern:*

Be it known that I, NICHOLAS YAGN, a subject of the Emperor of Russia, residing at St. Petersburg, in the Empire of Russia, have invented certain Improvements in Rubber Tires for Vehicles, of which the following is a full, clear, and exact description.

My invention relates to rubber tires and more especially to tires for wheels for vehicles; and the invention consists, essentially, in the cross-sectional conformation or construction of the tire and in certain improvements in the means for securing the tire to the metallic wheel-tire, and in the construction of the latter. The rubber tires for vehicles as heretofore made have a comparatively extensive bearing-surface and in wet weather splash the mud very extensively and to a greater extent on rough roads or roughly-paved, the rubber tire causing the wheels to rebound, thereby increasing the force of impact with the mud.

The invention has for its object to avoid this disagreeable feature in rubber tires by reducing the bearing-surface thereof to a minimum and to so construct said bearing-surface as to perform the function of a wedge, so as to cut or divide the mud. In securing the rubber tires to vehicle-wheels the metallic channeled tire is generally provided with converging lips or flanges that nip the rubber tire after being sprung into the channel, and said flanges or lips rapidly cut or wear the tire. On the other hand, unless the rubber tire is firmly seated in the channel of the metallic tire, the said rubber tire is apt to slip, thus furnishing an additional cause for wear by attrition.

The further object of my invention is to provide means whereby the rubber tire may be secured to the metallic tire or to the fellies without being nipped thereby and will yet be firmly held against independent motion in its seat.

To these ends the invention consists in the cross-sectional form of the rubber tire, in the construction of the seat for the said tire on the wheel of a vehicle, and in the means for securing the rubber tire to its seat, as will be now fully described, reference being had to the accompanying drawings, in which—

Figure 1 is a sectional elevation of a portion of a vehicle the wheels of which are provided with my improved rubber tire. Fig. 2 is a plan view of the same. Figs. 3 and 4 are sectional views of a portion of a wheel-tire of ordinary construction, showing one form of my improved rubber tire applied thereto. Fig. 5 is a like view showing another form of rubber tire, and Fig. 6 is also a view showing my improved construction of metallic tire or fellies having my improved rubber tire applied thereto, said tire differing slightly from those shown in Figs. 3 and 5.

In carrying my invention into practice I give the rubber tire A such a form as to reduce its bearing-surface to a minimum and so as to cut or divide the mud, and this may be done in various ways.

As shown in Figs. 1 to 4, the tire may have the form of a cone or half-ellipse in cross-section, or said tire may have its outer face straight and its inner face inclined, the tire having the form of a wedge in cross-section, as shown in Figs. 5 and 6, in which former figure the inclined face $a$ is slightly concaved in rear of the bearing-edge $a'$, while the tire A shown in Fig. 6 has its outer face also slightly concaved, as shown at $a^2$. In either form of tire the bearing-surface is reduced to a minimum—in fact, is substantially a point or line that divides the mud and water without splashing and presenting but little surface for the adherence of mud or water to be thrown off by centrifugal action.

In the construction of tires shown in Figs. 4, 5, and 6 the splash, if any, is directed inwardly, and should the road be sufficiently rough to cause the mud to be thrown beyond the wheels I use a splash-plate P, secured to the end of an arm P', attached to the wheel-axle in such manner as to adapt it for adjustment. This dash or splash plate P may be of angular form, so that the mud cannot be projected against the under side of the vehicle, or it may simply consist of a plate to prevent the lateral projection of the mud. In either case the plate or the vertical portion of the angular plate is preferably made of rubber and sufficiently flexible to yield to obstructions and travel over the same.

In Figs. 3, 4, and 5 I have shown the usual construction of channeled metallic tire B, with the converging retaining-flanges $b$, that nip the rubber tire A on opposite sides. It will readily be seen that the pressure due to the weight of the vehicle is exerted on the rubber tire along the retaining-flanges $b$ to a great extent, resulting in the rapid wear of the rubber tire. In Fig. 6 I have shown a construction whereby this is avoided. The metallic tire consists of two rings B', that have an inward bulge $b'$, which forms a seat for the tire proper B, the upper face of which is convex and corrugated. The rubber tire A has a concave recess in its seat-face to fit the tire B and annular flanges $a^3$. As shown in Fig. 6 the thickness of the tire B is such as to cause it to project some distance beyond its seat $b'$, its straight sides forming bearings for the flanges $a^3$ of the rubber tire A, and said parts are firmly secured together by means of the rings C, bolted or secured to the tire B by means of bolts or screws D, and clamping the flanges of the rubber tire A to the bearing-faces of the tire B. It will readily be understood that the tire B may be dispensed with and the fellies constructed as set forth in reference to the said tire and united by means of the rings C. The corrugations in the face of the tire B, Fig. 6, instead of being peripheral, may be formed transversely of said face.

Having thus described my invention, what I claim, and desire to secure by Letters Patent, is—

1. A rubber wheel-tire having its inner side inclined upwardly and its outer side substantially straight to form a wedge-shaped tread, for the purpose set forth.

2. A rubber wheel-tire having its inner side inclined upwardly and slightly concave and its outer edge also slightly concave to form a wedge-shaped tread, for the purpose specified.

3. The combination, with a vehicle-wheel provided with a convex and corrugated tread, of a rubber tire applied to said tread.

4. The combination, with a vehicle-wheel provided with a corrugated tread, of a rubber tire wedge-shaped in cross-section secured to said tread.

5. The combination, with a vehicle-wheel, of a tire composed of a convex and corrugated tread-ring, two supporting-rings provided with a seat-flange for said tread-ring, and cheek-rings bolted to the tread-ring outside of the periphery of the supporting-ring, of a rubber tire seated on the corrugated convex face of the tread-ring and having flanges extending into the groove formed between said tread and cheek-rings, between which said flanges are clamped, as set forth.

In testimony whereof I have signed my name to this specification in the presence of two subscribing witnesses.

NICHOLAS YAGN.

Witnesses:
N. TSCHEAALOFF,
J. FLIERLING.